United States Patent
Heo et al.

(10) Patent No.: US 7,447,311 B2
(45) Date of Patent: Nov. 4, 2008

(54) METHOD OF DESIGNING OPTIMUM ENCRYPTION FUNCTION AND OPTIMIZED ENCRYPTION APPARATUS IN A MOBILE COMMUNICATION SYSTEM

(75) Inventors: Won-Seok Heo, Suwon-shi (KR);
Seok-Chan Kim, Seoul (KR);
Dong-Wook Park, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 640 days.

(21) Appl. No.: 10/770,486

(22) Filed: Feb. 4, 2004

(65) Prior Publication Data

US 2004/0156499 A1 Aug. 12, 2004

(30) Foreign Application Priority Data

Feb. 5, 2003 (KR) ............ 10-2003-0007202

(51) Int. Cl.
*H04K 1/00* (2006.01)
*H04L 9/00* (2006.01)
*H04L 9/30* (2006.01)

(52) U.S. Cl. ..................................... 380/30
(58) Field of Classification Search ............ 380/30
See application file for complete search history.

(56) References Cited

U.S. PATENT DOCUMENTS

| | | | | |
|---|---|---|---|---|
| 3,798,359 A | * | 3/1974 | Feistel | 380/37 |
| 4,195,196 A | * | 3/1980 | Feistel | 380/262 |
| 6,189,095 B1 | * | 2/2001 | Coppersmith et al. | 713/150 |
| 6,246,768 B1 | | 6/2001 | Kim | |
| 2002/0186841 A1 | * | 12/2002 | Averbuj et al. | 380/44 |
| 2004/0131180 A1 | | 7/2004 | Mazuz et al. | |

FOREIGN PATENT DOCUMENTS

| | | |
|---|---|---|
| EP | 1 376 922 | 1/2004 |
| WO | WO 02/098052 A3 | 12/2002 |
| WO | WO 03/050784 A1 | 6/2003 |

OTHER PUBLICATIONS

H. Feistel, "Cryptography and Computer Privacy," Scientific American 228, No. 5, May 15-23, 1973.*
Adams, RFC 2144 CAST-128 Encryption Algorithm, May 1997.*
"Specification of the 3GPP Confidentiality and Integrity Algorithms," 3GPP, 3GPP Confidentiality and Integrity Algorithms; Document 2: KASUMI Specification (Release 1999), Copyright 2001.*

(Continued)

*Primary Examiner*—Nasser Moazzami
*Assistant Examiner*—Oscar A Louie
(74) *Attorney, Agent, or Firm*—Roylance, Abrams, Berdo & Goodman, L.L.P.

(57) ABSTRACT

A method of designing an optimum encryption algorithm and an optimized encryption apparatus are disclosed. In the encryption apparatus, a function block produces a first ciphertext of length $2n$ by encrypting a first plaintext of length $2n$ with an encryption code of length $4n$ generated from a key scheduler, and a second ciphertext of length m by encrypting the first ciphertext with a second plaintext of length m under the control of a controller. A memory stores the second ciphertext.

8 Claims, 8 Drawing Sheets

OTHER PUBLICATIONS

Small Hardware Implementation of W-CDMA Standard Cipher KASUMI; Akashi Satoh et al., IBM Japan Ltd. Tokyo Research Laboratory; Jul. 11, 2002; pp. 161-164.

Small and High-Speed Hardware Architectures for the 3GPP Standard Cipher KASUMI; Akashi Satoh et al.,; Lecture Notes in Computer Science, vol. 2433, pp. 48-62.

* cited by examiner

METHOD OF DESIGNING OPTIMUM ENCRYPTION FUNCTION AND OPTIMIZED ENCRYPTION APPARATUS IN A MOBILE COMMUNICATION SYSTEM

PRIORITY

This application claims priority under 35 U.S.C. § 119 to an application entitled "Method of Designing Optimum Encryption Function and Optimized Encryption Apparatus in a Mobile Communication System" filed in the Korean Industrial Property Office on Feb. 5, 2003 and assigned Ser. No. 2003-7202, the contents of which are incorporated herein by reference.

BACKGROUND OF THE INVENTION

1. Field of the Invention

The present invention relates generally to a mobile communication system, and in particular, to a method of designing an optimum encryption function for hardware implementations and an optimized encryption apparatus.

2. Description of the Related Art

As the analog first analog communication systems developed into subsequent digital communication systems, mobile subscribers expected stable high-rate data transmissions. Accordingly, service providers have made efforts to satisfy the user demand by presenting more reliable, advanced ciphering methods. The $3^{rd}$ generation communication system, which provides multimedia service (including voice and video data) for a highly sophisticated information-based society, requires standardization of encryption algorithms that ensures the confidentiality, security, and reliability of multimedia signals. The use of 11 encryption algorithms, f0 to f10 is under consideration for implementation in a universal mobile telecommunication system (UMTS). The UMTS is a global system for mobile communication (GSM) core network-based $3^{rd}$ generation system proposed by the $3^{rd}$ generation project partnership (3GPP). Among the encryption algorithms, the 3GPP confidentiality algorithm f8 and the 3GPP integrity algorithm f9 have already been standardized. These two algorithms are based on KASUMI, which is a modified version of the MISTY1 crypto algorithm developed by Mitsubishi Electronic Corporation from Japan.

The KASUMI is a Feistel block cipher that outputs a 64-bit ciphertext from a 64-bit input plaintext with 8 round operations. Plaintext is defined as cleartext messages that are not encrypted, and ciphertext is defined as text that has been encrypted with an encryption algorithm and key and thus ensures confidentiality.

Figure 1:
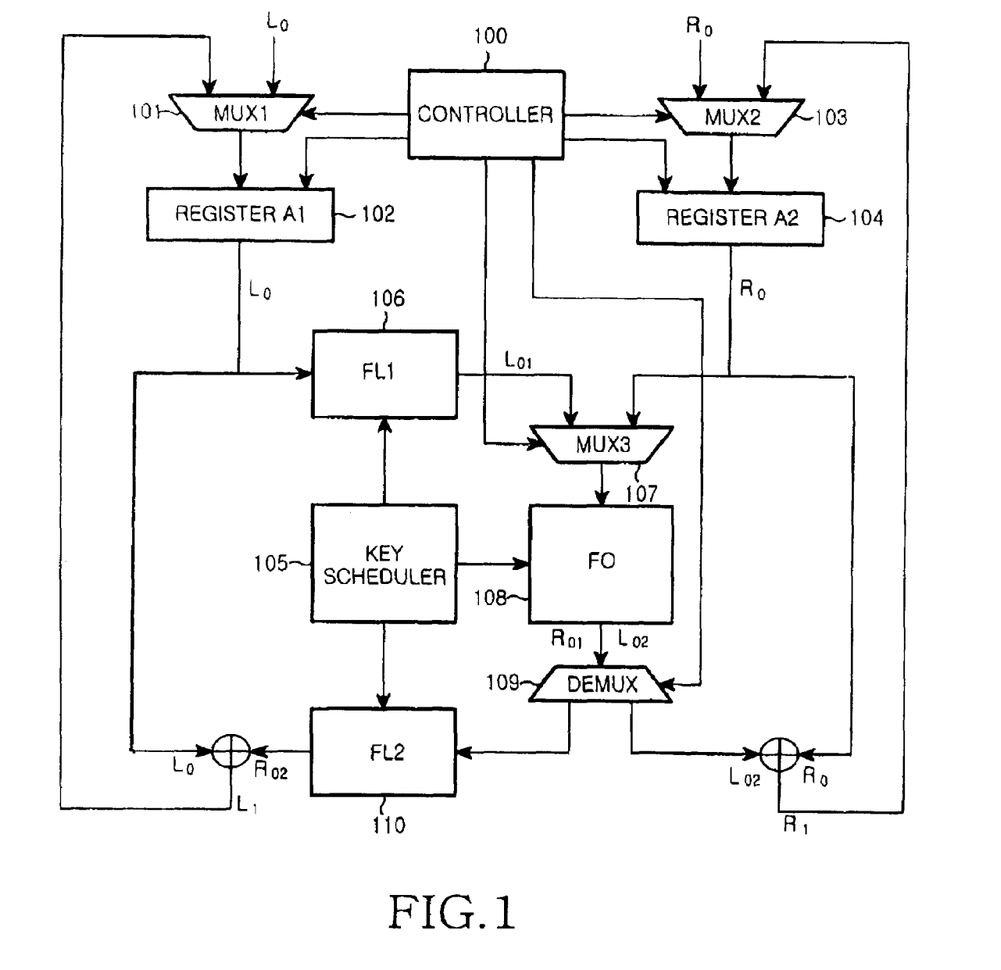
FIG. 1 is a block diagram of a conventional KASUMI hardware.

FIG. 1 is a block diagram of a conventional KASUMI hardware. Referring to FIG. 1, the KASUMI encryption block is comprised of a plurality of multiplexers (MUX1, MUX2 and MUX3) 101, 103, and 107, a demultiplexer (DEMUX) 109, registers (register A1 and register A2) 102 and 104, a plurality of function blocks (FL1, FL2, and FO) 106, 110 and 108, a controller 100 for controlling the components of the KASUMI encryption block, and a key scheduler 105 for providing cipher keys.

An 64-bit plaintext input is divided into two 32-bit strings $L_0$ and $R_0$, which are applied to the input of the MUX 1 100 and the MUX 2 103, respectively. The MUX1 101 outputs the 32-bit string $L_0$ to the register A1 102 under the control of the controller 100, and the MUX2 103 outputs the 32-bit string $R_0$ to the register A2 104 under the control of the controller 100. The register A1 102 and register A2 104 temporarily store the 32-bit strings $L_0$ and $R_0$ and output them upon receipt of a control signal from the controller 100.

The KASUMI encryption block takes different encryption paths depending on whether it is an odd round or an even round. For an odd round, the FL1 block 106 encrypts the bit string $L_0$ received from the register A1 102 with first cipher keys $KL_{i,1}$ and $KL_{i,2}$ received from the key scheduler 105 and outputs a ciphertext $L_{01}$ to the MUX3 107. The MUX3 107 outputs the ciphertext $L_{01}$ to the FO block 108 according to a control signal from the controller 100. The FO block 108 encrypts the 32-bit string $L_{01}$ with a second cipher key $KI_{i,j}$ and a third cipher key $KO_{i,j}$ received from the key scheduler 105 and outputs a ciphertext $L_{02}$ to the DEMUX 109 under the control of the controller 100. The DMUX 109 outputs the 32-bit string $L_{02}$ under the control of the controller 100. The bit string $L_{02}$ is exclusive-ORed with the bit string $R_0$ from the register A2 104, resulting in a ciphertext $R_1$. The signal $R_1$ is fed back to the MUX2 103.

For an even round, the MUX 3 107 feeds the 32-bit string $R_0$ received from the register A2 104 to the FO block 108 under the control of the controller 100. The FO block 108 encrypts the 32-bit string $R_0$ with the second and third cipher keys $KI_{i,j}$ and $KO_{i,j}$ received from the key scheduler 105 and outputs a ciphertext $R_{01}$ to the DEMUX 109 under the control of the controller 100. The DMUX 109 outputs the 32-bit string $R_{01}$ to the FL2 block 110 under the control of the controller 100. The FL2 block 110 encrypts the bit string $R_{01}$ with a first cipher key $KL_{i,j}$ received from the key scheduler 105 and outputs a ciphertext $R_{02}$. The bit string $R_{02}$ is exclusive-ORed with the bit string $L_0$ from the register A1 102, resulting in a ciphertext $L_1$. The signal $L_1$ is fed back to the MUX1 101. As the round increases, i and j in the cipher keys $KL_{i,j}$, $KI_{i,j}$ and $KO_{i,j}$ are increased.

The two FL blocks 106 and 110 perform the same cryptographic function in the conventional KASUMI encryption. The redundant use of the function blocks decreases user efficiency of the device and increases power consumption.

Figure 2:
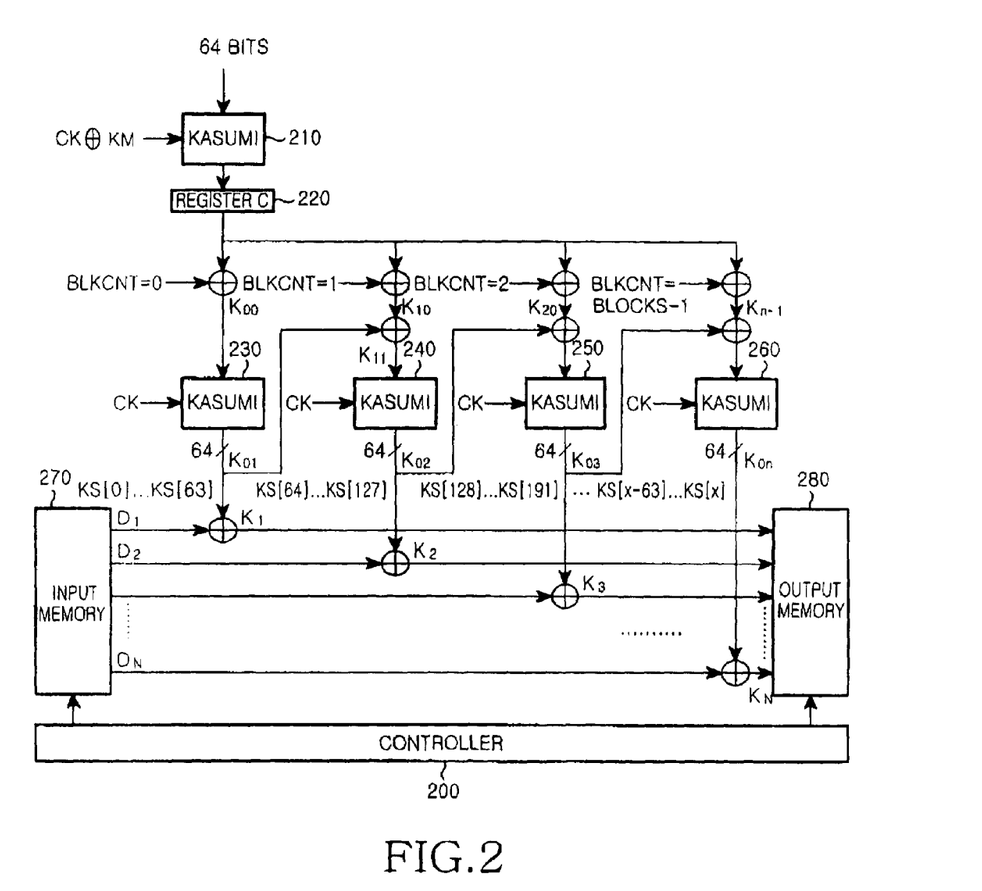
FIG. 2 illustrates a conventional encryption algorithm with conventional KASUMI operations.

FIG. 2 depicts the 3GPP confidentiality function f8 with conventional KASUMI computations. Referring to FIG. 2, the confidentiality function f8 stores a plaintext to be transmitted in an input memory 270. A ciphertext is produced by repeated KASUMI computations on the plaintext and stored in an output memory 280. A register C 220 temporarily stores the 64-bit input data under the control of a controller 200. BLKCNT denotes a block counter for processing the input 64-bit data, CK denotes a 128-bit cipher key, and KM denotes a key modifier, which is a 128-bit constant. Each KASUMI can encrypt a maximum of 5114 bits, which is equivalent to 80 rounds. The controller 200 controls the input and output memories 260 and 280 by control signals. The control signals include an address signal for assigning an address to the memories 260 and 280, an enable/disable signal for enabling/disabling them, a read/write signal for reading/writing stored data or ciphertext, and a data signal for storing a data unit at an assigned address. Thus, the memories 260 and 280 store or output data units at or from assigned addresses.

A KASUMI encryption block 230 encrypts the initial input 64-bit data string with the exclusive-OR of a 128-bit CK and a 128-bit KM (CK⊕KM) and outputs an initial ciphertext $K_{00}$. The register C 220 temporarily stores the signal $K_{00}$ and outputs it under the control of an encryption block controller (not shown). The signal $K_{00}$ is exclusive-ORed with a block count value 0 (BLKCNT 0) and applied to the input of a KASUMI encryption block 230. The KASUMI encryption block 230 encrypts the received signal with a CK and outputs a ciphertext $K_{01}$. At the same time, the controller 200 reads a plaintext $D_1$ from the first address in the input memory 270.

The signals $K_{O1}$ and $D_1$ are exclusive-ORed to a ciphertext $K_1$. The output memory 280 stores the final ciphertext $K_1$ at its first address under the control of the controller 280. The f8 function repeats this encryption according to the length of plaintext.

In the f8 function as described above, the controller 200 reads a plaintext from each address in the input memory 270, encrypts it with the output of a KASUMI encryption block, and stores the resulting ciphertext in the output memory 280. The use of the separate input and output memories leads to inefficient hardware implementation of the f8 function and increases power consumption.

SUMMARY OF THE INVENTION

It is, therefore, an object of the present invention to provide an encryption apparatus for dividing an input plaintext bit sting of length $2n$ to first and second sub-bit strings of length n and outputting a ciphertext bit string of length $2n$ after encrypting them.

It is another object of the present invention to provide an encryption method for dividing an input plaintext bit sting of length $2n$ to first and second sub-bit strings of length n and outputting a ciphertext bit string of length $2n$ after encrypting them.

It is a further object of the present invention to provide an encryption apparatus for outputting a first ciphertext bit string of length n by encrypting a first plaintext bit string of length $2n$ in a first encryption and outputting a second ciphertext bit string of length m by encrypting a second plaintext bit string of length $2m$ in a second encryption.

It is still another object of the present invention to provide an encryption apparatus for outputting a first ciphertext bit string of length n by encrypting a first plaintext bit string of length $2n$ in a first encryption and outputting a second ciphertext bit string of length m by encrypting a second plaintext bit string of length $2m$ in a second encryption.

According to one aspect of the present invention, in an encryption apparatus for dividing a plaintext of length $2n$ into first and second sub-bit strings of length n and producing a ciphertext of length $2n$ by encrypting the first and second sub-bit strings, a first function block produces a first ciphertext of length n by encrypting the first sub-bit string with first encryption codes $KL_{1,1}$ and $KL_{1,2}$, or a third ciphertext of length n by encrypting the second sub-bit string with the first encryption codes $KL_{1,1}$ and $KL_{1,2}$. A second function block produces a fourth ciphertext of length n by encrypting the first ciphertext with second encryption codes $KO_{1,1}$, $KO_{1,2}$ and $KO_{1,3}$, or the second ciphertext by encrypting the first sub-bit string with the second encryption codes $KO_{1,1}$, $KO_{1,2}$ and $KO_{1,3}$ and third encryption codes $KI_{1,1}$, $KI_{1,2}$ and $KI_{1,3}$. A key scheduler provides the first encryption codes $KL_{1,1}$ and $KL_{1,2}$, the second encryption codes $KO_{1,1}$, $KO_{1,2}$ and $KO_{1,3}$, and the third encryption codes $KI_{1,1}$, $KI_{1,2}$ and $KI_{1,3}$ to the first and second function blocks. Here, the encryption codes are of length n. A controller controls a plurality of multiplexers to feed the first sub-bit string to the first or second function block and controls the first and second function blocks to encrypt the received sub-bit string with the first encryption codes $KL_{1,1}$ and $KL_{1,2}$, the second encryption codes $KO_{1,1}$, $KO_{1,2}$ and $KO_{1,3}$, and the third encryption codes $KI_{1,1}$, $KI_{1,2}$ and $KI_{1,3}$.

According to another aspect of the present invention, in an encryption method for dividing a plaintext of length $2n$ into first and second sub-bit strings of length n and producing a ciphertext of length $2n$ by encrypting the first and second sub-bit strings, a first ciphertext of length n is produced by encrypting the first sub-bit string with first encryption codes $KL_{1,1}$ and $KL_{1,2}$. A fourth ciphertext of length n is produced by encrypting the first ciphertext with second encryption codes $KO_{1,1}$, $KO_{1,2}$ and $KO_{1,3}$, and the third encryption codes $KI_{1,1}$, $KI_{1,2}$ and $KI_{1,3}$. A fifth ciphertext is produced by exclusive-ORing the fourth ciphertext with the second sub-bit string. A second ciphertext of length n is produced by encrypting the first sub-bit string with the second encryption codes $KO_{1,1}$, $KO_{1,2}$ and $KO_{1,3}$, and the third encryption codes $KI_{1,1}$, $KI_{1,2}$ and $KI_{1,3}$. A third ciphertext of length n is produced by encrypting the second ciphertext with the first encryption codes $KL_{1,1}$ and $KL_{1,2}$. A sixth ciphertext is then produced by exclusive-ORing the third ciphertext with the second sub-bit string.

According to a further aspect of the present invention, in an encryption apparatus, a function block produces a first ciphertext of length $2n$ by encrypting a first plaintext of length $2n$ with an encryption code of length $4n$ generated from a key scheduler, and a second ciphertext of length m by encrypting the first ciphertext with a second plaintext of length m under the control of a controller. The key scheduler generates the encryption code. A memory outputs the second plaintext and stores the second ciphertext under the control of the controller. The controller reads the second plaintext from the memory and stores the second ciphertext in the memory.

According to still another aspect of the present invention, in an encryption method, a first ciphertext of $2n$ is produced by encrypting a first plaintext of length $2n$ with an encryption code of length $4n$. A second ciphertext of length m is then produced by encrypting the first ciphertext with a second plaintext of length m, and stored in a memory.

BRIEF DESCRIPTION OF THE DRAWINGS

The above and other objects, features and advantages of the embodiments of the present invention will become more apparent from the following detailed description when taken in conjunction with the accompanying drawings in which.

DETAILED DESCRIPTION OF THE PREFERRED EMBODIMENT

Various embodiments of the present invention will be described herein below with reference to the accompanying drawings. In the following description, well-known functions or constructions are not described in detail since they would obscure the invention in unnecessary detail.

Figure 3:
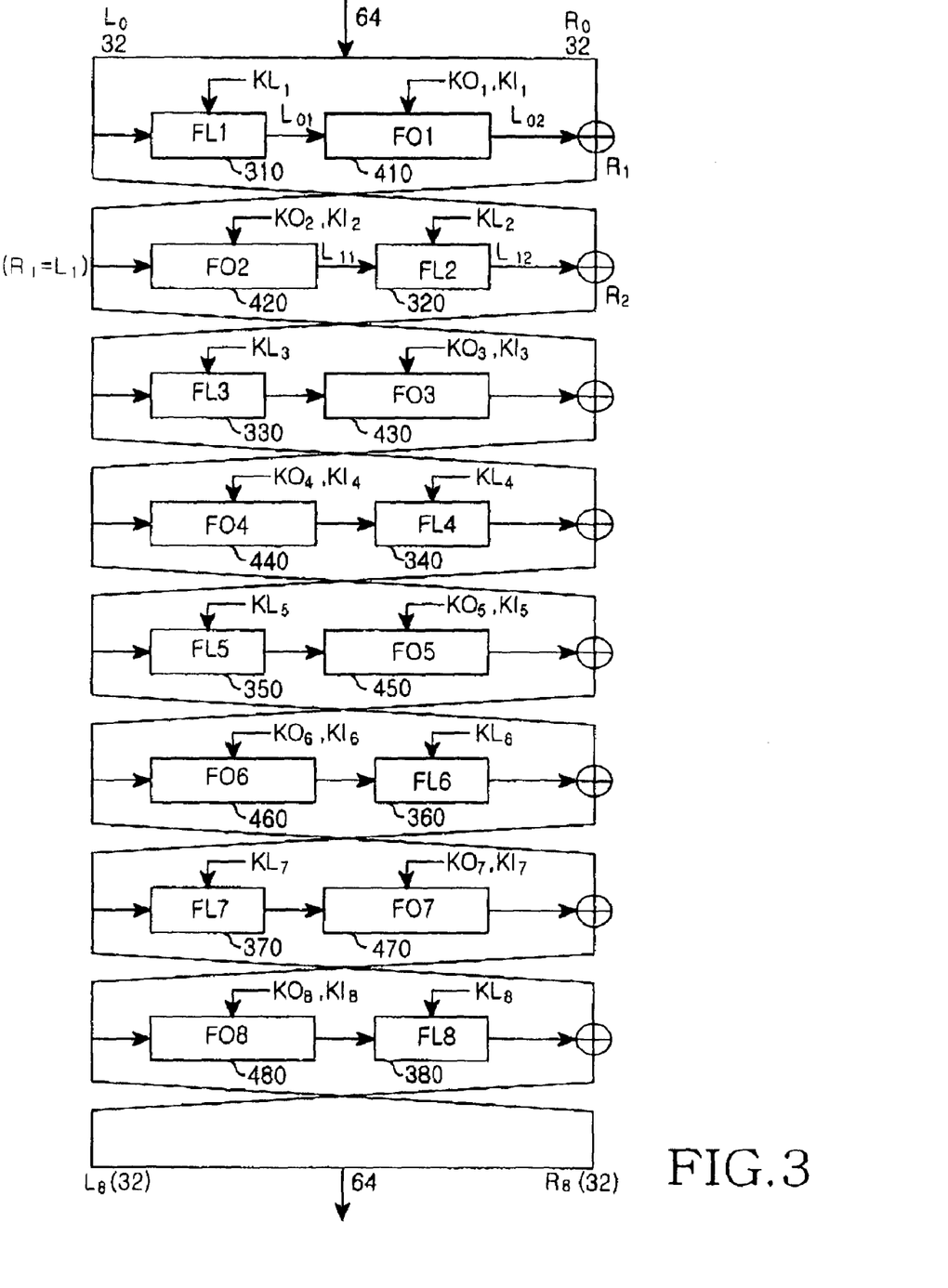
FIG. 3 illustrates a KASUMI encryption algorithm to which an embodiment of the present invention is applied.

FIG. 3 illustrates a KASUMI encryption algorithm to which the present invention is applied. Referring to FIG. 3, the KASUMI encryption algorithm is a Feistel block cipher that outputs a 64-bit ciphertext from a 64-bit input plaintext through 8 round operations. The Feistel structure refers to an encryption system that divides a 2n-bit input string into two n-bit strings $L_0$ and $R_0$ and encrypts/decrypts them in their respective function blocks for m rounds. Since full diffusion is achieved after 2 rounds in the Feistel structure, fast encryption is possible. Specifically, the KASUMI encryption block divides a 64-bit plaintext input into two 32-bit strings $L_0$ and $R_0$ and outputs a 64-bit ciphertext by encrypting them with cipher keys $KI_i$ ($1 \leq i \leq 8$), $KL_i$ ($1 \leq i \leq 8$), and $KO_i$ ($1 \leq i \leq 8$) generated from a key scheduler (not shown) in FLi and FOi function blocks ($1 \leq i \leq 8$).

For an odd round, an FL1 function block 310 encrypts the 32-bit string $L_0$ with a first cipher key $KL_1$ and outputs a ciphertext $L_{01}$. An FO1 function block 410 encrypts the bit string $L_{01}$ with a second cipher key $KO_1$ and a third cipher key $KI_1$ and outputs a 32-bit string $L_{02}$. The signal $L_{02}$ is exclusive-ORed with the 32-bit string $R_0$, resulting in a ciphertext $R_1$.

For an even round (i.e., a second round), an FO2 function block 420 encrypts the 32-bit string $R_1$ (=$L_1$) with a second cipher key $KO_2$ and a third cipher key $KI_2$ and outputs a ciphertext $L_{11}$. An FL2 function block 320 encrypts the bit string $L_{11}$ with a first cipher key $KL_2$ and outputs a ciphertext $L_{12}$. The signal $L_{12}$ is exclusive-ORed with the initial input bit string $L_0$, resulting in a ciphertext $R_2$. The remaining rounds are performed in an identical manner, using the appropriate function blocks and cipher keys, as sown in FIG. 3. In this manner, the KASUMI produces a final 64-bit ciphertext from the input of a 64-bit plaintext after 8 rounds.

Figure 4:
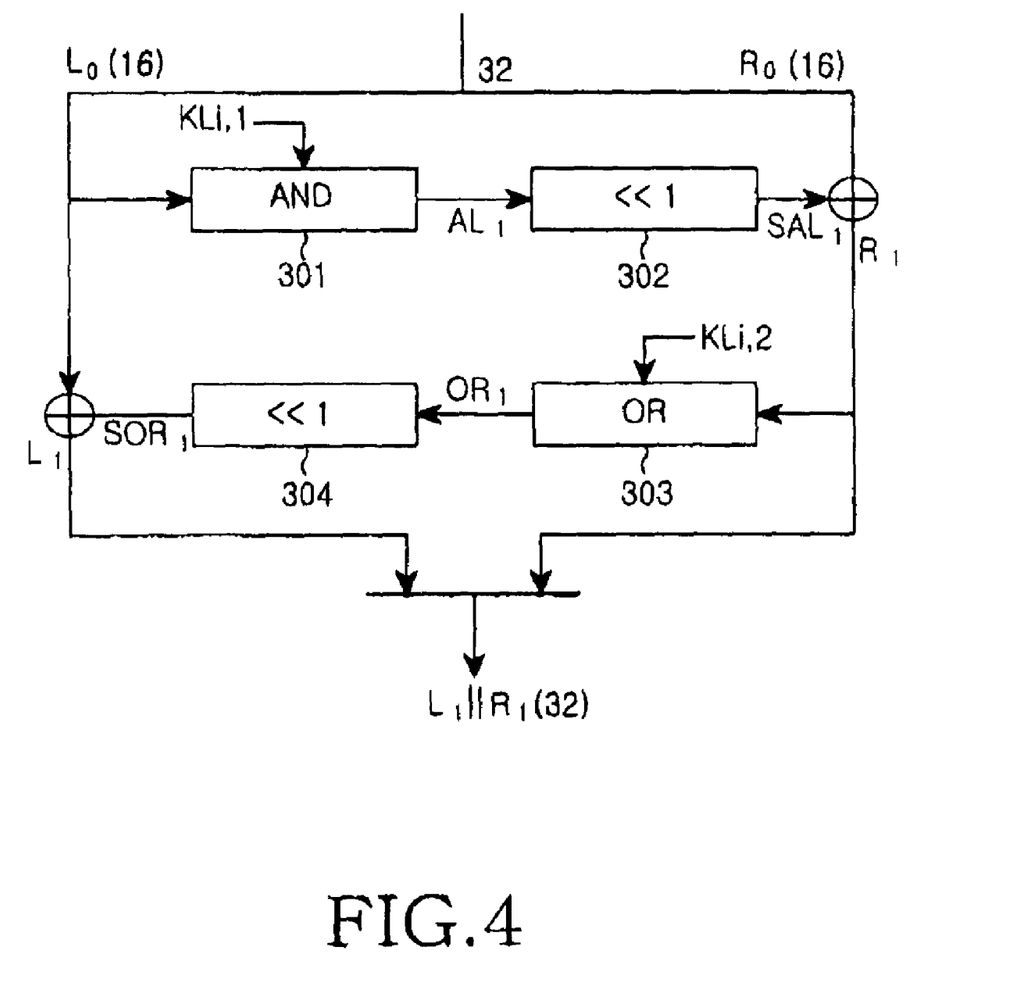
FIG. 4 illustrates the detailed structure of an FL function block illustrated in FIG. 3.

FIG. 4 illustrates the detailed structure of the FL function blocks illustrated in FIG. 3. Referring to FIG. 4, the FL1 function block 310 is taken by way of example. The FL1 function block 310 is comprised of a plurality of an AND gate 301, shift registers 302 and 304, and an OR gate 303. A 32-bit input string is divided into two 16-bit strings $L_0$ and $R_0$. The AND gate 301 AND-operates the 16-bit string $L_0$ with a 16-bit sub-cipher key $KL_{1,1}$ and outputs a 16-bit string $AL_1$. The shift register 302 shifts the signal $AL_1$ to the left by one bit and outputs a signal $SAL_1$. The 16-bit strings $SAL_1$ and $R_0$ are exclusive-ORed, resulting in a sub-ciphertext $R_1$. The OR gate 303 OR-operates the signal $R_1$ with a sub-cipher key $KL_{1,2}$ and outputs a 16-bit string $OR_1$. The shift register 304 shifts the signal $OR_1$ to the left by one bit and outputs a signal $SOR_1$. The signals $SOR_1$ and $L_0$ are exclusive-ORed, resulting in a sub-ciphertext $L_1$. Thus, the FL1 function block 310 produces the 32-bit ciphertext $L_1//R_1$ (=$L_{01}$ in FIG. 3) by the sub-ciphertexts $R_1$ and $L_1$.

Figure 5:
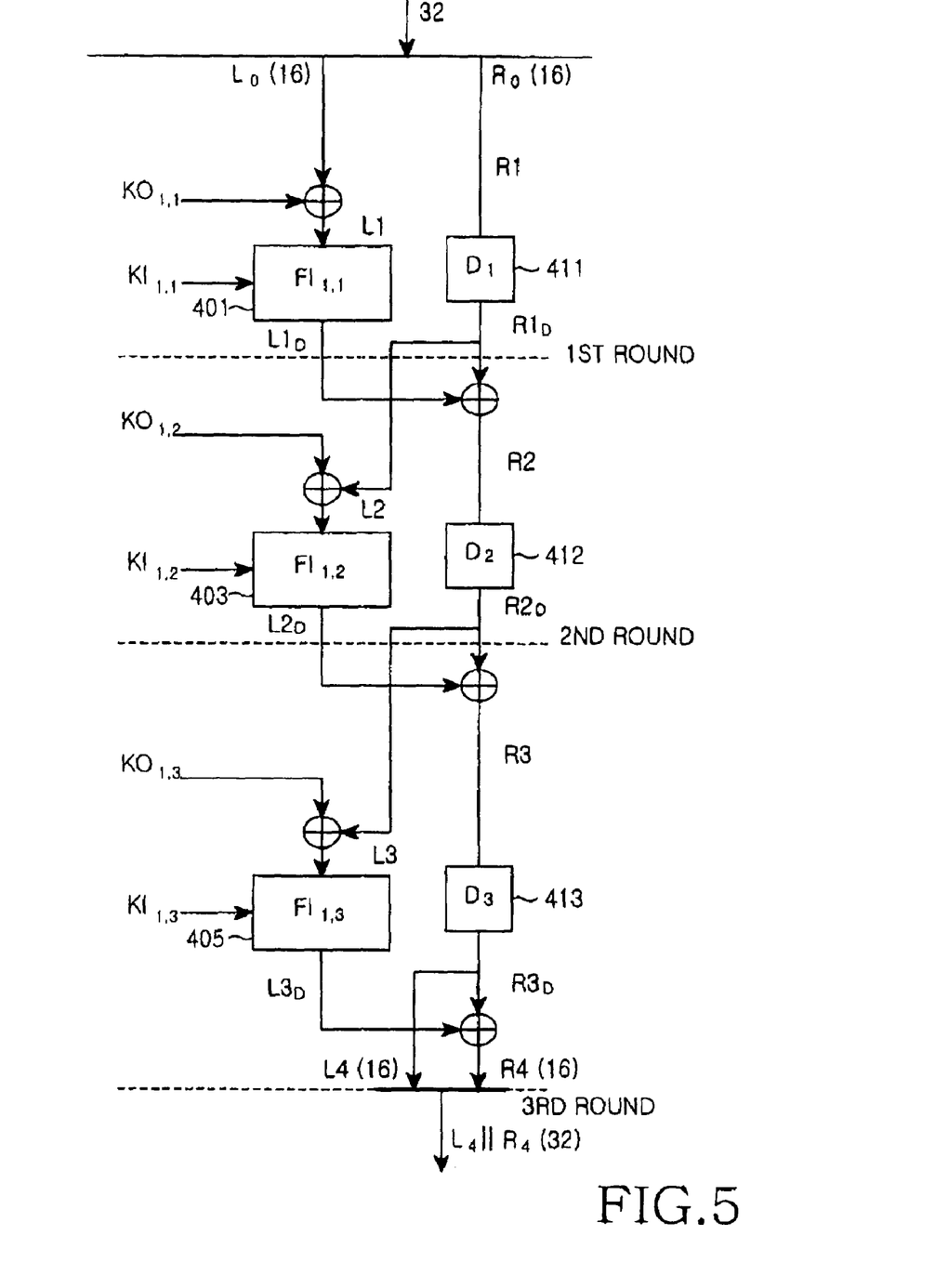
FIG. 5 illustrates the detailed structure of an FO function block illustrated in FIG. 3.

FIG. 5 illustrates the detailed structure of the FO function blocks illustrated in FIG. 3. Referring to FIG. 5, the FO1 function block 410 is taken by way of example. The FO1 function block 410 is comprised of a plurality of $FI_{i,j}$ sub-function blocks ($1 \leq i \leq 3$, $1 \leq j \leq 3$). An input 32-bit string $L_{01}$ in FIG. 3 is divided into two 16-bit strings $L_0$ and $R_0$. For a first round, a signal $L_1$ is generated by exclusive-ORing the 16-bit string $L_0$ and a 16-bit sub-cipher key $KO_{1,1}$. An $FI_{1,1}$ sub-function block 401 encrypts the signal $L_1$ with a 16-bit sub-cipher key $KI_{1,1}$ and outputs a signal $L_{1D}$. Meanwhile, a delay (D1) 411 delays the signal $R_0$ (=$R_1$) and outputs a delayed signal $R_{1D}$ in order to synchronize to the output timing of the signal $L_{1D}$.

For a second round, a signal $L_2$ is generated by exclusive-ORing the 16-bit string $R_{1D}$ with a 16-bit sub-cipher key $KO_{1,2}$. An $FI_{1,2}$ sub-function block 403 encrypts the signal $L_2$ with a 16-bit sub-cipher key $KI_{1,2}$ and outputs a signal $L_{2D}$. Meanwhile, a signal $R_2$ is generated by exclusive-ORing the signals $R_{1D}$ and $L_{1D}$. A delay (D2) 412 delays the signal $R_2$ and outputs a delayed signal $R_{2D}$ in order to synchronize to the output timing of the signal $L_{2D}$.

For a third round, a signal $L_3$ is generated by exclusive-ORing the 16-bit string $R_{2D}$ with a 16-bit sub-cipher key $KO_{1,3}$. An $FI_{1,3}$ sub-function block 405 encrypts the signal $L_3$ with a 16-bit sub-cipher key $KI_{1,3}$ and outputs a signal $L_{3D}$. Meanwhile, a signal $R_3$ is generated by exclusive-ORing the signals $R_{2D}$ and $L_{2D}$. A delay (D3) 413 delays the signal $R_3$ and outputs a delayed signal $R_{3D}$ in order to synchronize to the output timing of the signal $L_{3D}$. A signal $R_4$ is generated by exclusive-ORing the signals $L_{3D}$ and $R_{3D}$. A final 32-bit ciphertext $L_4//R_4$ (=$L_{02}$ in FIG. 3) is produced from the 16-bit strings $R_4$ and $R_{3D}$ (=$L_4$).

Figure 6:
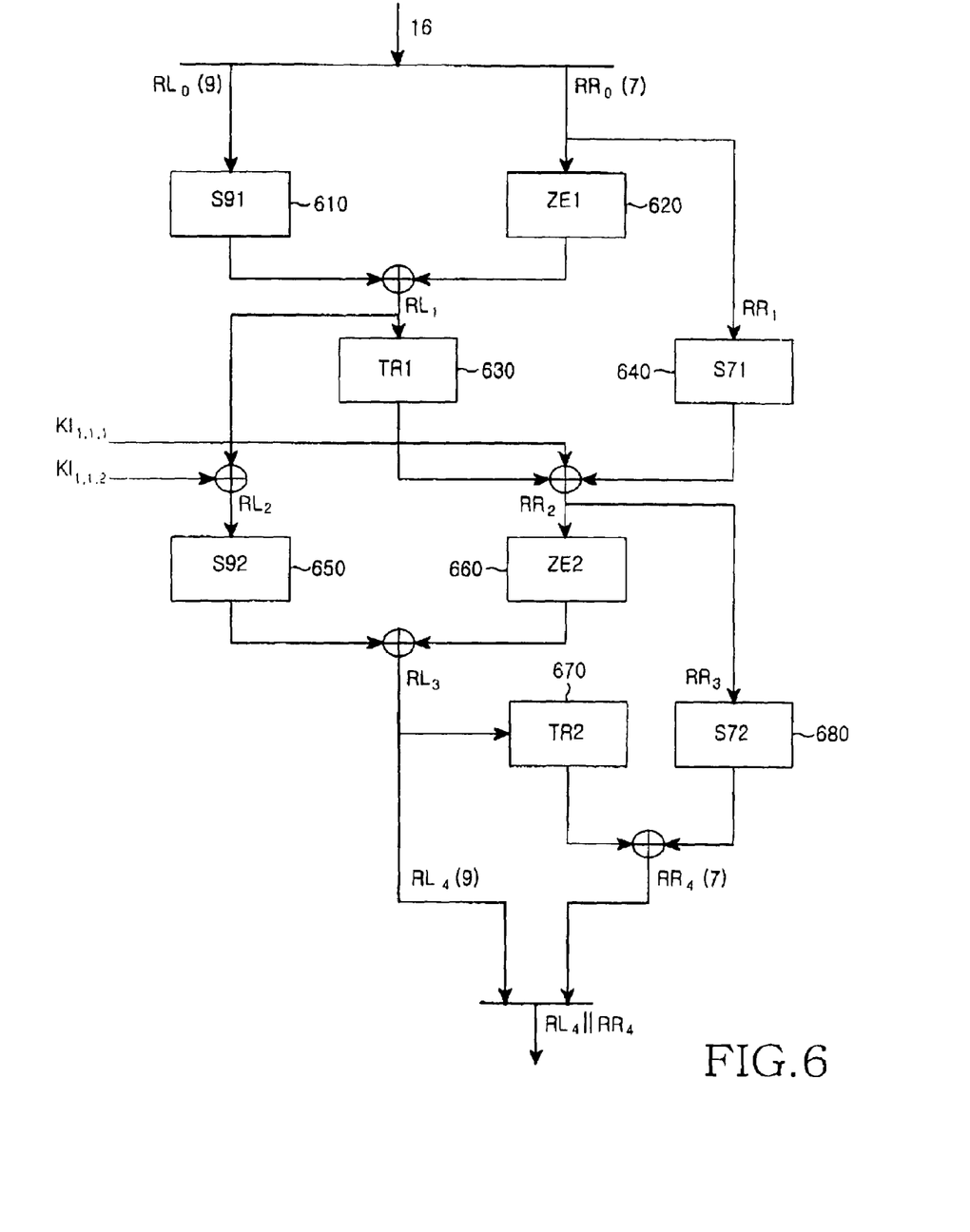
FIG. 6 illustrates the detailed structure of an FI sub-function block illustrated in FIG. 5.

FIG. 6 illustrates the detailed structure of the FI sub-function blocks illustrated in FIG. 5. The $FI_{1,1}$ sub-function block is taken by way of example.

Referring to FIG. 6, a 16-bit input signal ($L_1$ in FIG. 5) is divided into a 9-bit string $RL_0$ and a 7-bit string $RR_0$. An SBox91 (S91) operator 610 generates a 9-bit string $y0, y1, \ldots, y8$ from the input signal $RL_0$ by $$y0 = x0 \oplus x2 \oplus x3 \oplus x2x5 \oplus x5x6 \oplus x0x7 \oplus x1x7 \oplus x2x7 \oplus x4x8 \oplus x5x8 \oplus x7x8 \oplus 1$$

$$y1 = x1 \oplus x0x1 \oplus x2x3 \oplus x0x4 \oplus x1x4 \oplus x0x5 \oplus x3x5 \oplus x6 \oplus x1x7 \oplus x2x7 \oplus x5x8 \oplus 1$$

$$y2 = x1 \oplus x0x3 \oplus x3x4 \oplus x0x5 \oplus x2x6 \oplus x3x6 \oplus x5x6 \oplus x4x7 \oplus x5x7 \oplus x6x7 \oplus x8 \oplus x0x8 \oplus 1$$

$$y3 = x0 \oplus x1x2 \oplus x0x3 \oplus x2x4 \oplus x5 \oplus x0x6 \oplus x1x6 \oplus x4x7 \oplus x0x8 \oplus x1x8 \oplus x7x8$$

$$y4 = x0x1 \oplus x1x3 \oplus x4 \oplus x0x5 \oplus x3x6 \oplus x0x7 \oplus x6x7 \oplus x1x8 \oplus x2x8 \oplus x3x8$$

$$y5 = x2 \oplus x1x4 \oplus x4x5 \oplus x0x6 \oplus x1x6 \oplus x3x7 \oplus x4x7 \oplus x6x7 \oplus x5x8 \oplus x6x8 \oplus x7x8 \oplus 1$$

$$y6 = x0 \oplus x2x3 \oplus x1x5 \oplus x2x5 \oplus x4x5 \oplus x3x6 \oplus x4x6 \oplus x5x6 \oplus x7 \oplus x1x8 \oplus x3x8 \oplus x5x8 \oplus x7x8$$

$$y7 = x0x1 \oplus x0x2 \oplus x1x2 \oplus x3 \oplus x0x3 \oplus x2x3 \oplus x4x5 \oplus x2x6 \oplus x3x6 \oplus x2x7 \oplus x5x7 \oplus x8 \oplus 1$$

$$y8 = x0x1 \oplus x2 \oplus x1x2 \oplus x3x4 \oplus x1x5 \oplus x2x5 \oplus x1x6 \oplus x4x6 \oplus x7 \oplus x2x8 \oplus x3x8 \quad (1)$$

A ZE1 unit 620 receives the signal $RR_0$, adds two zeroes to the MSB (Most Significant Bit) of the signal $RR_0$ and outputs a 9-bit string. The outputs of the S91 operator 610 and the ZE1 unit 620 are exclusive-ORed, resulting in a 9-bit string $RL_1$. The signal $RL_1$ is exclusive-ORed with a 9-bit sub-cipher key $KI_{1,1,2}$, resulting in a 9-bit string $RL_2$.

A TR1 unit 630 removes two zero bits from the MSBs of the 9-bit string $RL_1$. An SBox71 (S71) operator 640 generates a 7-bit string $y0, y1, \ldots, y6$ from the input signal $RR_0$ (=$RR_1$) by $$y0 = x1x3 \oplus x4 \oplus x0x1x4 \oplus x5 \oplus x2x5 \oplus x3x4x5 \oplus x6 \oplus x0x6 \oplus x1x6 \oplus x3x6 \oplus x2x4x6 \oplus x1x5x6 \oplus x4x5x6$$

$$y1 = x0x1 \oplus x0x4 \oplus x2x4 \oplus x5 \oplus x1x2x5 \oplus x0x3x5 \oplus x6 \oplus x0x2x6 \oplus x3x6 \oplus x4x5x6 \oplus 1$$

$$y2 = x0 \oplus x0x3 \oplus x2x3 \oplus x1x2x4 \oplus x0x3x4 \oplus x1x5 \oplus x0x2x5 \oplus x0x6 \oplus x0x1x6 \oplus x2x6 \oplus x4x6 \oplus 1$$

$$y3 = x1 \oplus x0x1x2 \oplus x1x4 \oplus x3x4 \oplus x0x5 \oplus x0x1x5 \oplus x2x3x5 \oplus x1x4x5 \oplus x2x6 \oplus x1x3x6$$

$$y4 = x0x2 \oplus x3 \oplus x1x3 \oplus x1x4 \oplus x0x1x4 \oplus x2x3x4 \oplus x0x5 \oplus x1x3x5 \oplus x0x4x5 \oplus x1x6 \oplus x3x6 \oplus x0x3x6 \oplus x5x6 \oplus 1$$

$$y5 = x2 \oplus x0x2 \oplus x0x3 \oplus x1x2x3 \oplus x0x2x4 \oplus x0x5 \oplus x2x5 \oplus x4x5 \oplus x1x6 \oplus x1x2x6 \oplus x0x3x6 \oplus x3x4x6 \oplus x2x5x6 \oplus 1$$

$$y6 = x1x2 \oplus x0x1x3 \oplus x0x4 \oplus x1x5 \oplus x3x5 \oplus x6 \oplus x0x1x6 \oplus x2x3x6 \oplus x1x4x6 \oplus x0x5x6 \quad (2)$$

The outputs of the TR1 630 and the S71 operator 640 are exclusive-ORed with a sub-cipher key $KI_{1,1,1}$, resulting in a 7-bit string $RR_2$.

An SBox92 (S92) operator 650 generates a 9-bit string $y0, y1, \ldots, y8$ from the signal $RL_2$ by Eq. (1). A ZE2 unit 660 receives the signal $RR_1$, adds two zeroes to the MSB of the signal $RR_1$, and outputs a 9-bit string. The outputs of the S92 operator 650 and the ZE2 unit 660 are exclusive-ORed, resulting in a 9-bit string $RL_3$. A TR2 unit 670 removes two zero bits from the MSBs of the 9-bit string $RL_3$. An SBox72 (S72) operator 680 generates a 7-bit string $y0, y1, \ldots, y6$ from the input signal $RR_2$ $(=RR_3)$ by Eq. (2). The outputs of the TR2 670 and the S72 operator 680 are exclusive-OR-operated, resulting in a 7-bit string $RR_4$.

A final 16-bit ciphertext $RL_4//RR_4$ is produced from the 9-bit string $RL_3$ $(=RL_4)$ and the 7-bit string $RR_4$.

Figure 7:
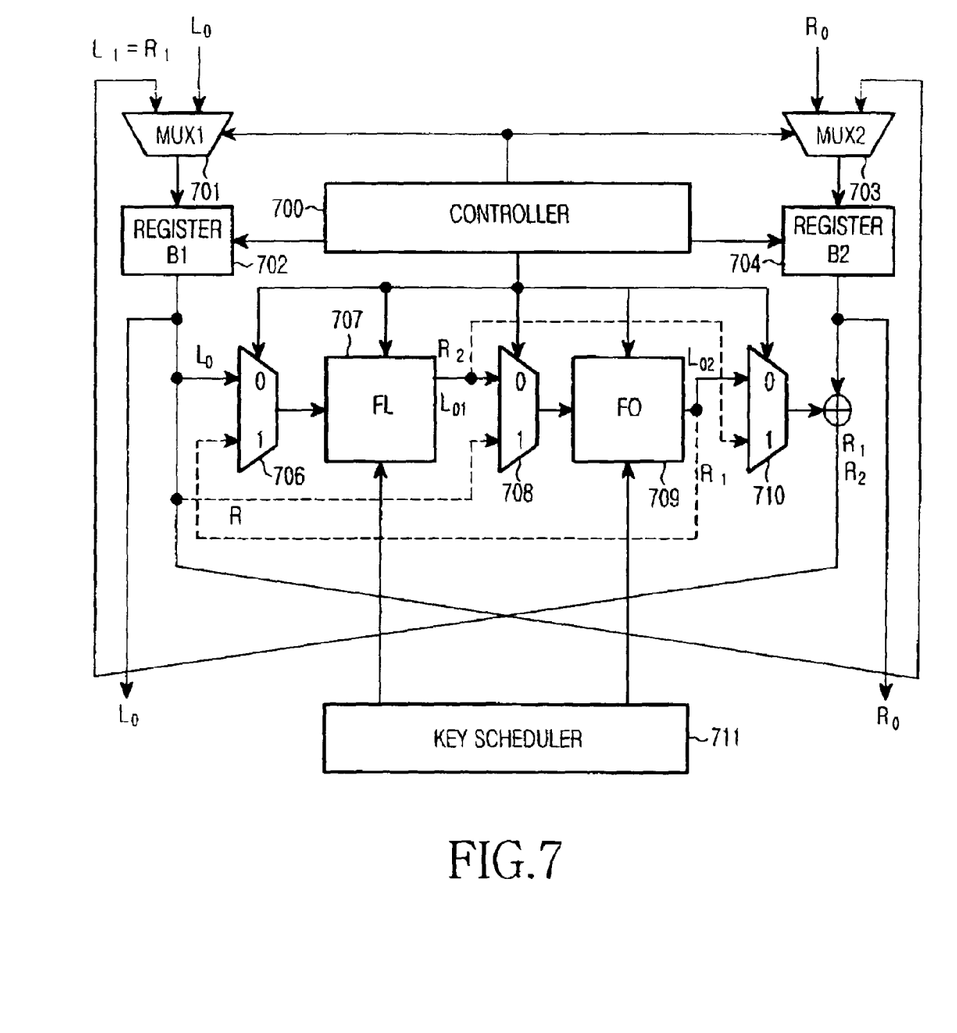
FIG. 7 is a block diagram of a KASUMI hardware according to an embodiment of the present invention.

FIG. 7 is a block diagram of a KASUMI hardware according to the present invention. Referring to FIG. 7, the KASUMI encryption block is comprised of a plurality of multiplexers (MUX1 to MUX5) 701, 703, 706, 708 and 710, registers (register B1 and register B2) 702 and 704, a plurality of function blocks (FL and FO) 707 and 709, a controller 700 for controlling the components of the KASUMI encryption block, and a key scheduler 711 for providing cipher keys. The controller 700 takes different encryption paths for an even round and an odd round by controlling the MUXs 701, 703, 706, 708 and 710.

For an odd round, a 64-bit plaintext input is divided into two 32-bit strings $L_0$ and $R_0$, which are applied to the input of the MUX 1 701 and the MUX 2 703, respectively. The MUX1 701 outputs the 32-bit string $L_0$ to the register B1 702 under the control of the controller 700, and the MUX2 703 outputs the 32-bit string $R_0$ to the register B2 704 under the control of the controller 700. The register B1 702 and register B2 704 temporarily store the 32-bit strings $L_0$ and $R_0$ and output them upon receipt of a control signal from the controller 700. The controller 700 controls the MUXs 706, 708 and 710 to take a "zero-path" indicated by solid lines. The MUX3 706 outputs the signal $L_0$ to the FL function block 707 via the zero-path. The FL block 707 encrypts the bit string $L_0$ with a first odd-numbered cipher key $KL_{i,j}$ ($0 \leq i \leq 8$, $0 \leq j \leq 2$) received from the key scheduler 711 and outputs a ciphertext $L_{01}$ to the MUX4 708. The MUX4 708 outputs the signal $L_{01}$ to the FO function block 709 via the zero-path. The FO block 709 encrypts the bit string $L_{01}$ with a second odd-numbered cipher key $KL_{i,j}$ and a third odd-numbered cipher key $KO_{i,j}$ ($0 \leq i \leq 8$, $0 \leq j \leq 3$) received from the key scheduler 711 and outputs a ciphertext $L_{02}$ to the MUX5 710. The MUX5 710 outputs the signal $L_{02}$ via the zero-path. A ciphertext $R_1$ $(=L_1)$ is then produced by exclusive-ORing the signal $L_{02}$ with the signal $R_0$ received from the register B2 704 and fed back to the MUX1 701.

For an even round, the 32-bit strings $R_1$ and $L_0$ are applied to the input of the MUX1 701 and MUX2 703, respectively. The MUX1 701 outputs the 32-bit string $R_1$ to the register B1 702 under the control of the controller 700, and the MUX2 703 outputs the 32-bit string $L_0$ to the register B2 704 under the control of the controller 700. The register B1 702 and register B2 704 temporarily store the 32-bit strings $R_1$ and $L_0$ and output them upon receipt of a control signal from the controller 700. The controller 700 controls the MUXs 706, 708 and 710 to take a "one-path" indicated by dotted lines. The MUX4 708 receives the signal $R_1$ under the control of the controller 700 and outputs the signal $R_1$ to the FO function block 708 via the one-path. The FO block 709 encrypts the bit string $R_1$ with a second even-numbered cipher key $KL_{i,j}$ and a third even-numbered cipher key $KO_{i,j}$ ($0 \leq i \leq 8$, $0 \leq j \leq 3$) received from the key scheduler 711 and outputs a ciphertext $R_{11}$ to the MUX3 706. The MUX3 706 outputs the signal $R_{11}$ to the FL function block 707 via the one-path. The FL block 707 encrypts the bit string $R_{11}$ with a first odd-numbered cipher key $KL_{i,j}$ ($0 \leq i \leq 8$, $0 \leq j \leq 2$) received from the key scheduler 711 and outputs a ciphertext $R_{12}$ to the MUX5 710. The MUX5 710 outputs the signal $R_{12}$ via the one-path. A ciphertext $R_2 (=L_2)$ is then produced by exclusive-ORing the signal $R_{12}$ with the signal $L_0$ received from the register B2 704 and fed back to the MUX1 701.

As described above, the controller 700 controls the MUXs 706, 708 and 710 to take the zero-path for an odd round. Thus, a 32-bit input string is encrypted with a first odd-numbered cipher key $KL_{i,j}$ in the FL function block 707 and then with a second off-numbered cipher key $KL_{i,j}$ and a third off-numbered cipher key $KO_{i,j}$ in the FO function block 709. For an even round, the controller 700 controls the MUXs 706, 708 and 710 to take the one-path. Thus, a 32-bit input string is encrypted with a second off-numbered cipher key $KL_{i,j}$ and a third off-numbered cipher key $KO_{i,j}$ and then with a first odd-numbered cipher key $KL_{i,j}$ in the FL function block 707.

Implementation of the KASUMI in hardware using the single FL function block 707 and the single FO function block 709 achieves the same effects as the conventional KASUMI implementation, but reduces the number of components used and power consumption.

Figure 8:
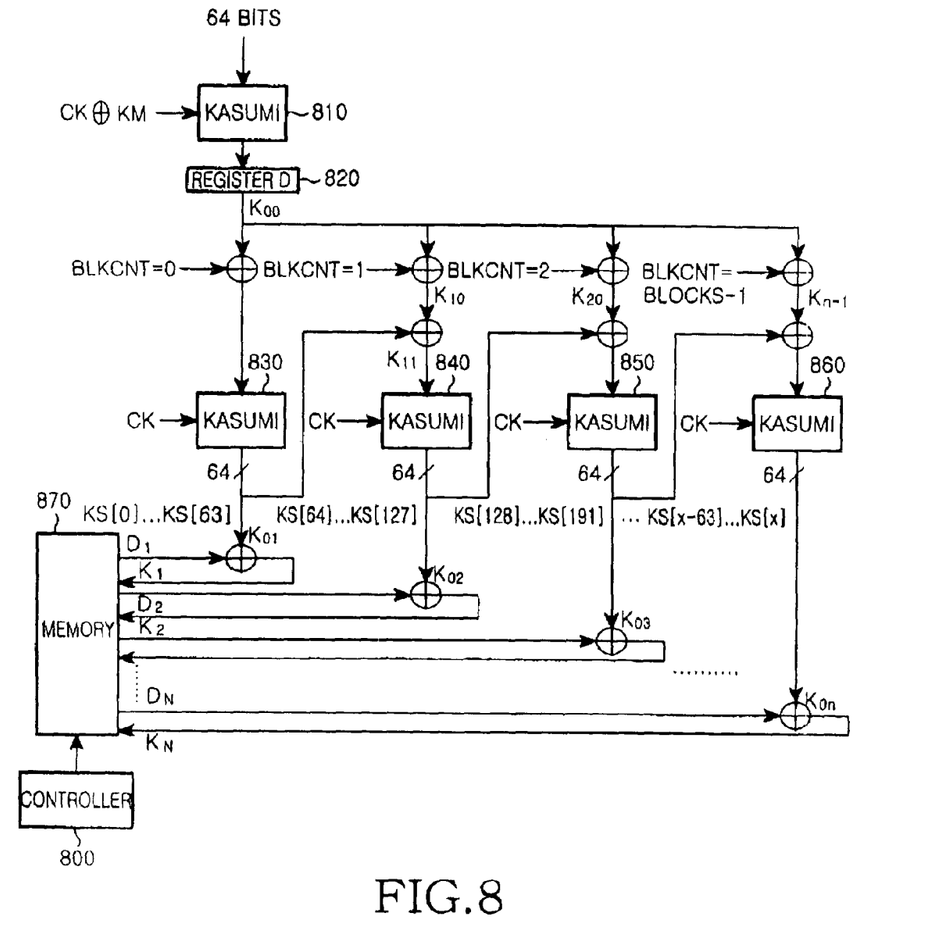
FIG. 8 illustrates a conventional encryption algorithm with KASUMI operations according to an embodiment of the present invention.

FIG. 8 depicts the 3GPP confidentiality function f8 with KASUMI computations according to an embodiment of the present invention. A plaintext from a memory 870 is encrypted for a plurality of rounds using a plurality of KASUMI encryption blocks and a final ciphertext is stored in the same memory 870.

The confidentiality f8 algorithm is a block cipher for encrypting up to 5114 bits, that is, up to 80-rounds of KASUMI operations. The number of KASUMI encryption rounds varies with the length of the plaintext and is counted by a block counter (BLKCNT). The plurality of KASUMI encryption blocks are shown for the purpose of illustrating feed-back of the ciphertext from one KASUMI encryption block and re-encryption of the ciphertext as a plaintext for rounds. CK denotes a 128-bit cipher key generated from a key scheduler (not shown), and KM denotes a key modifier being a 128-bit constant. A controller 800 controls the memory 870 by control signals. The control signals include an address signal for assigning an address for the plaintext, an enable/disable signal for enabling/disabling the memory 870, a read/write signal for reading/writing stored data or ciphertext in/from the memory 870, and a data signal for storing a data unit at an assigned address in the memory 870.

A KASUMI encryption block 810 encrypts an initial 64-bit string date input with the exclusive-OR of a 128-bit CK and a 128-bit KM (CK⊕KM), received from the key scheduler and outputs an initial ciphertext $K_{00}$. A register D 820 temporarily stores the signal $K_{00}$ and outputs it under the control of an encryption block controller (not shown). This is an initial operation for KASUMI encryption.

For a first KASUMI encryption, the signal $K_{00}$ is exclusive-ORed with a block count value 0 (BLKCNT 0) and applied to the input of a KASUMI encryption block 830. The KASUMI encryption block 830 encrypts the received signal with a CK and outputs a 64-bit ciphertext $K_{01}$ ranging from bit 0 to bit 63. The controller 800 reads a plaintext $D_1$ from the first address in the memory 870. The signals $K_{01}$ and $D_1$ are exclusive-ORed to a ciphertext $K_1$. The memory 870 stores the first ciphertext $K_1$ at an address assigned to the plaintext $D_1$, that is, the first address under the control of the controller 800.

For a second KASUMI encryption, a signal $K_{10}$ is generated by exclusive-ORing the signal $K_{00}$ with a block count value 1 (BLKCNT 1), and then exclusive-ORed with the signal $K_{01}$ received from the KASUMI encryption block 830, resulting in a signal $K_{11}$. A KASUMI encryption block 840 encrypts the signal $K_{11}$ with a CK and outputs a 64-bit ciphertext $K_{02}$ ranging from bit 64 to bit 127. The controller 800 reads a plaintext $D_2$ from the second address in the memory 870. The signals $K_{02}$ and $D_2$ are exclusive-ORed to a ciphertext $K_2$. The memory 870 stores the second ciphertext $K_2$ at an address assigned to the plaintext D2, that is, the second address under the control of the controller 800.

In the f8 function, the block count and the number of KASUMI encryption rounds are determined according to the length of the plaintext. The controller 800 reads the plaintext from an address in the memory 870 and stores a ciphertext at the same address by sharing the memory 870 for reading plaintext and storing ciphertext.

In accordance with certain embodiments of the present invention, an encryption algorithm is implemented in hardware using a reduced number of devices and sharing a memory for reading plaintext and storing ciphertext. Therefore, the overall power consumption of an encryption apparatus is reduced.

While the various embodiments of the invention have been shown and described with reference to certain preferred embodiments thereof, it will be understood by those skilled in the art that various changes in form and details can be made therein without departing from the spirit and scope of the invention as defined by the appended claims.

What is claimed is:

1. An encryption apparatus configured to generate a first ciphertext of length 2*n* by firstly encrypting a first plaintext of length 2*n* and generating a second ciphertext of length m by secondly encrypting the first ciphertext with a second plaintext of length m comprising,
   a function block configured to produce the first ciphertext of length 2*n* by encrypting the first plaintext of length 2*n* with an encryption code of length 4*n* generated from a key scheduler;
   a memory storing the second plaintext of length m; and
   a main controller configured to read the second plaintext of length m from the memory, controlling the second ciphertext of length m to be generated by encrypting the first ciphertext with the second plaintext, and storing the second ciphertext in the memory, wherein the main controller controls the memory to output a first sub-bit string of a predetermined length in the second plaintext of length m from a predetermined address by applying a control signal to the memory, controls the function block to generate a second subciphertext of the predetermined length by encrypting the first sub-bit string with the first ciphertext, and controls the memory to store the second sub-ciphertext in the predetermined address; wherein the function block comprises:
   a first function block configured to produce a first ciphertext of length n by encrypting the first sub-bit string with first encryption codes KL(1,1) and KL(1,2) or a third ciphertext of length n by encrypting a second ciphertext with the first encryption codes KL(1,1) and KL(1,2);
   a second function block configured to produce a fourth ciphertext of length n by encrypting the first ciphertext with second encryption codes KO(1,1), KO(1,2) and KO(1,3) and third encryption codes KI(1,1), KI(1,2) and KI(1,3) or the second ciphertext by encrypting the first sub-bit string with the second encryption codes KO(1,1), KO(1,2) and KO(1,2) and the third encryption codes KI(1,1), KI(1,2) and KI(1,3);
   a key scheduler configured to provide the first encryption codes KL(1,1), and KL(1,2) the second encryption codes KO(1,1), KO(1,2) and KO(1,3), and the third encryption codes KL(1,1), KI(1,2) and KI(1,3) for the first sub-bit string, the first ciphertext, and the second ciphertext, the encryption codes being length n; and
   a function block controller configured to control a plurality of multiplexers to feed the first sub-bit string to the first or second function block and controlling the first and second function blocks to encrypt the received sub-bit string with the first encryption codes KL(1,1) and KL(1,2), the second encryption codes KO(1,1), KO(1,2) and KO(1,3), and the third encryption codes KI(1,1), KI(1,2) and KI(1,3).

2. The encryption apparatus of claim 1, wherein the function block repeats the first encryption of the first ciphertext of length 2*n* according to the length of the second plaintext stored in the memory.

3. The encryption apparatus of claim 1, wherein the main controller applies a read signal to the memory so that the memory outputs the first sub-bit string, controls the function block to generate the second sub-ciphertext by encrypting the first sub-bit string with the first ciphertext, and applies a write signal to the memory so that the memory stores the second sub-ciphertext.

4. The encryption apparatus of claim 3, wherein the memory comprises a buffer for reading and writing under the control of the controller.

5. An encryption method of generating a first ciphertext of length 2*n* by firstly encrypting a first plaintext of length 2*n* and generating a second ciphertext of length m by secondly encrypting the first ciphertext with a second plaintext of length m, comprising the steps of:
   producing the first ciphertext of 2*n* by encrypting the first plaintext of length 2*n* with an encryption code of length 4*n* received from a key scheduler by a function block; and
   reading the second plaintext of length m from a memory, controlling the second ciphertext of length m to be generated by encrypting the first ciphertext with the second plaintext, and storing the second ciphertext in the memory by a controller;
   wherein the step of producing the first ciphertext comprises receiving the first sub-bit string of length n in response to a control signal received from a controller, and producing a first ciphertext of length n by encrypting the first sub-bit string with first encryption codes $KL_{1,1}$ and $KL_{1,2}$ received from a key scheduler or a third ciphertext of length n by encrypting a second ciphertext received from a second function block with the first encryption codes $KL_{1,1}$ and $KL_{1,2}$ in a first function block, and
   wherein the step of generating the second ciphertext comprises receiving the first ciphertext of length n in response to the control signal received from the controller and producing a fourth ciphertext of length n by encrypting the first ciphertext with second encryption codes $KO_{1,1}$, $KO_{1,2}$ and $KO_{1,3}$, and third encryption codes $KI_{1,1}$, $KI_{1,2}$ and $KI_{1,3}$ received from the key scheduler, or the second ciphertext of length n by encrypting the first sub-bit string with the second encryption codes $KO_{1,1}$, $KO_{1,2}$ and $KO_{1,3}$, and the third encryption codes $KI_{1,1}$, $KI_{1,2}$ and $KI_{1,3}$;

wherein the step of reading the second plaintext, producing the second ciphertext, and storing the second ciphertext comprises the steps of:

reading a first sub-bit string of a predetermined length in the second plaintext of length m from a predetermined address in the memory by the controller;

controlling a second sub-ciphertext of the predetermined length to be generated by secondly encrypting the first sub-bit string with the first ciphertext by the controller; and storing the second sub-ciphertext in the predetermined address by the controller.

6. The encryption method of claim 5, wherein in the step of generating the first ciphertext, the function block generates the first ciphertext by repeating the first encryption according to the length of the second plaintext stored in the memory.

7. The encryption method of claim 5, wherein the step of reading the second plaintext, producing the second ciphertext, and storing the second ciphertext comprises the steps of:

reading a first sub-bit string of a predetermined length in the second plaintext of length m from a predetermined address in the memory by the controller;

controlling a second sub-ciphertext of the predetermined length to be generated by secondly encrypting the first sub-bit string with the first ciphertext by the controller; and storing the second sub-ciphertext in the predetermined address by applying a write signal to the memory by the controller.

8. The encryption method of claim 7, wherein the memory is a buffer for reading and writing under the control of the controller.

\* \* \* \* \*